United States Patent
Szawarski et al.

(10) Patent No.: US 10,377,269 B2
(45) Date of Patent: Aug. 13, 2019

(54) METHOD OF CONTROLLING A VEHICLE SEATING ASSEMBLY

(71) Applicant: Ford Global Technologies, LLC, Dearborn, MI (US)

(72) Inventors: Hubert Szawarski, Waterford, MI (US); Arlindo Rocha, Kingsville (CA); Mark A. Cuddihy, New Boston, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 15/486,625

(22) Filed: Apr. 13, 2017

(65) Prior Publication Data
US 2018/0297489 A1    Oct. 18, 2018

(51) Int. Cl.
*B60N 2/02*    (2006.01)
*B60N 2/01*    (2006.01)
(Continued)

(52) U.S. Cl.
CPC ............ *B60N 2/0244* (2013.01); *B60N 2/01* (2013.01); *B60N 2/067* (2013.01); *B60N 2/28* (2013.01);
(Continued)

(58) Field of Classification Search
CPC .......... B60N 2/0244; B60N 2/01; B60N 2/06; B60N 2/20; B60N 2002/0268;
(Continued)

(56) References Cited

U.S. PATENT DOCUMENTS 4,547,718 A * 10/1985 Ratzel .................. B60N 2/0224
                                                                 318/103
4,802,706 A *  2/1989 Onimaru ............. B60N 2/0224
                                                                 108/140
(Continued)

FOREIGN PATENT DOCUMENTS

CN        103332123 B    4/2016

OTHER PUBLICATIONS

Herzberg, DE 102012024304, published Jul. 18, 2013 (machine translation).*
(Continued)

*Primary Examiner* — Courtney D Heinle
(74) *Attorney, Agent, or Firm* — Vichit Chea; Price Heneveld LLP (57) ABSTRACT

A vehicle includes a front seating assembly and a rear seating assembly. An occupant sensor senses occupancy of the front seating assembly. A proximity sensor senses an object in a footwell behind the front seating assembly. A rear door sensor senses the opening of a rear door. A controller activates an actuator to move the front seating assembly forward based on the sensed occupancy, a sensed object, and sensed door opening. A method of controlling a vehicle seating assembly includes the steps of: sensing the front seating assembly is unoccupied with the occupant sensor; detecting in the footwell behind the front seating assembly with the proximity sensor; sensing a rear door position with the door sensor; and moving the front seating assembly forward when the front seating assembly is unoccupied, an object is in the footwell, and the rear door is in an open position.

16 Claims, 7 Drawing Sheets

(51) Int. Cl.
  *B60N 2/06* (2006.01)
  *B60N 2/28* (2006.01)
  *B60N 2/005* (2006.01)
(52) U.S. Cl.
  CPC ............... *B60N 2002/0055* (2013.01); *B60N 2002/0256* (2013.01); *B60N 2002/0268* (2013.01)
(58) Field of Classification Search
  CPC .. B60N 2/067; B60N 2/28; B60N 2002/0055; B60N 2002/0256
  See application file for complete search history.

(56) References Cited

U.S. PATENT DOCUMENTS

| | | | | |
|---|---|---|---|---|
| 6,195,603 | B1 * | 2/2001 | Gauger | B60N 2/0248 296/68.1 |
| 8,351,515 | B2 * | 1/2013 | Kuroki | H04H 60/27 375/240.26 |
| 2002/0195806 | A1 * | 12/2002 | Thomas | B60R 21/01538 280/735 |
| 2003/0080699 | A1 * | 5/2003 | Rumney | B60N 2/002 318/9 |
| 2003/0121704 | A1 * | 7/2003 | Breed | B60N 2/002 177/144 |
| 2004/0036330 | A1 * | 2/2004 | Itami | B60N 2/0248 297/243 |
| 2009/0292425 | A1 * | 11/2009 | Nagata | B60N 2/0244 701/49 |
| 2013/0127221 | A1 * | 5/2013 | Seibold | B60N 2/06 297/344.24 |
| 2013/0253779 | A1 * | 9/2013 | Fujii | B60N 2/0248 701/49 |
| 2016/0332538 | A1 * | 11/2016 | Rocha | B60N 2/06 |
| 2016/0332539 | A1 * | 11/2016 | Rawlinson | B60N 2/0244 |
| 2017/0166089 | A1 * | 6/2017 | Frye | B60N 2/002 |
| 2017/0368964 | A1 * | 12/2017 | Kim | B60N 2/0232 |

OTHER PUBLICATIONS

Baumgartner et al., WO 2017/032623, filed Aug. 24, 2015 (machine translation).*

* cited by examiner

METHOD OF CONTROLLING A VEHICLE SEATING ASSEMBLY

FIELD OF THE DISCLOSURE

The present disclosure generally relates to a method of controlling a vehicle seating assembly. More specifically, the present disclosure relates to a method of controlling a vehicle seating assembly for ingress and egress of rear occupants in a vehicle.

BACKGROUND OF THE INVENTION

Occupant space between rows in automobiles is typically reduced when front occupants move the front seats rearward to sit comfortably. Positioning the front seat rearward can create difficulty for entry and exit of rear seat occupants. For example, the positioning of the front seat rearward can create inconvenient situations when placing or removing a child from a child's car seat on a daily basis. Similarly, placing or removing a package or cargo item in a rearward row of seats or the rear footwell area can be more difficult with the front seat positioned rearward for the comfort of the front seat occupant.

SUMMARY OF THE INVENTION

According to a first aspect of the present disclosure, a method of controlling a vehicle seating assembly includes the steps of sensing a front seating assembly is unoccupied with an occupant sensor, detecting in a footwell behind the front seating assembly with a proximity sensor, sensing a rear door position with a door sensor, and moving the front seating assembly forward when the front seating assembly is unoccupied, an object is in the footwell, and the rear door is in an open position.

Embodiments of the first aspect of the present disclosure can include any one or a combination of the following features:
- the step of detecting an object in a footwell behind the front seating assembly with a proximity sensor further includes the step of sensing a change in an infrared field by the proximity sensor;
- the step of moving the front seating assembly forward further includes the step of pivoting a seatback in a forward direction;
- the step of moving the front seating assembly forward further includes the step of sliding the front seating assembly forward;
- the proximity sensor performs the step of detecting an object in a footwell behind the front seating assembly with a proximity sensor from a rearward portion of a seat of the front seating assembly;
- the proximity sensor performs the step of detecting an object in a footwell behind the front seating assembly with a proximity sensor from a rearward portion of a seatback of the front seating assembly;
- returning the front seating assembly to a last-known position;
- sensing a front seating assembly is unoccupied with an occupant sensor is performed with a weight sensor in the front seating assembly; and
- measuring that a vehicle equipped with the vehicle seating assembly is stationary with a speed sensor.

According to a second aspect of the present disclosure, a method of controlling a vehicle seating assembly includes the steps of sensing a front seating assembly is unoccupied with an occupant sensor, detecting in a footwell behind the front seating assembly with a proximity sensor, sensing a rear door position with a door sensor, detecting that the front seating assembly is rearward of a forward-most position with a fore-aft position sensor, and moving the front seating assembly forward when the front seating assembly is unoccupied, an object is in the footwell, the rear door is in an open position, and the front seating assembly is rearward of the forward-most position.

Embodiments of the second aspect of the present disclosure can include any one or a combination of the following features:
- the step of detecting an object in a footwell behind the front seating assembly with a proximity sensor further includes the step of sensing a change in a capacitive field by the proximity sensor;
- the step of moving the front seating assembly forward further includes the step of pivoting a seatback in a forward direction;
- the step of moving the front seating assembly forward further includes the step of sliding the front seating assembly forward;
- the proximity sensor performs the step of detecting an object in a footwell behind the front seating assembly with a proximity sensor from a rearward portion of a seat of the front seating assembly; and
- the proximity sensor performs the step of detecting an object in a footwell behind the front seating assembly with a proximity sensor from a rearward portion of a seatback of the front seating assembly.

According to a third aspect of the present disclosure, a vehicle includes a front seating assembly and a rear seating assembly. An occupant sensor senses occupancy of the front seating assembly. A proximity sensor senses an object in a footwell behind the front seating assembly. A rear door sensor senses the opening of a rear door. A controller activates an actuator to move the front seating assembly forward based on the sensed occupancy, a sensed object, and sensed door opening.

Embodiments of the third aspect of the present disclosure can include any one or a combination of the following features:
- the actuator pivots a seatback of the front seating assembly forward when the front seating assembly is moved forward;
- the actuator slides the front seating assembly forward on a rail system when the front seating assembly is moved forward;
- the proximity sensor is positioned in a seat of the front seating assembly; and
- the proximity sensor is positioned in a seatback of the front seating assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
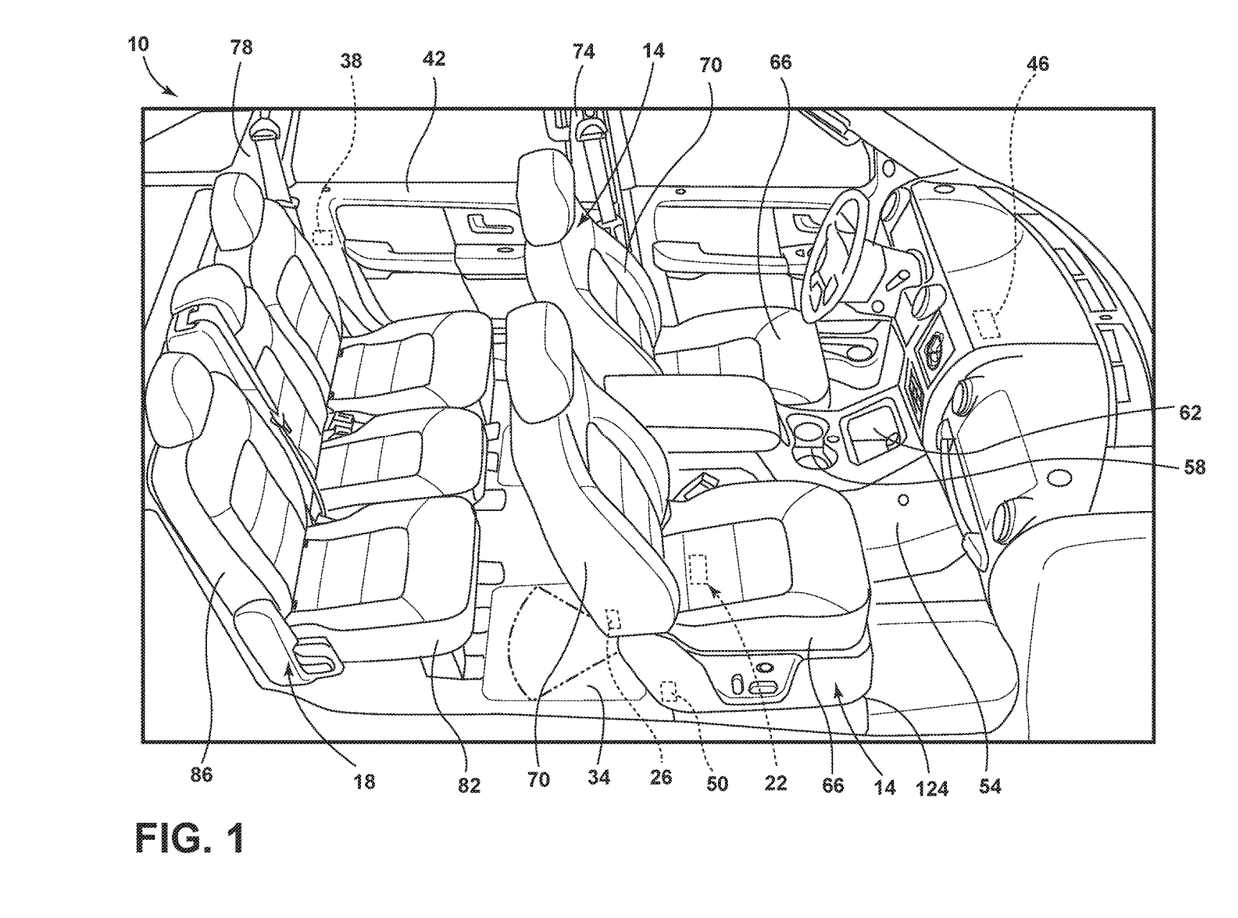
FIG. 1 is a top perspective view of an interior of a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to ingress and egress from a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
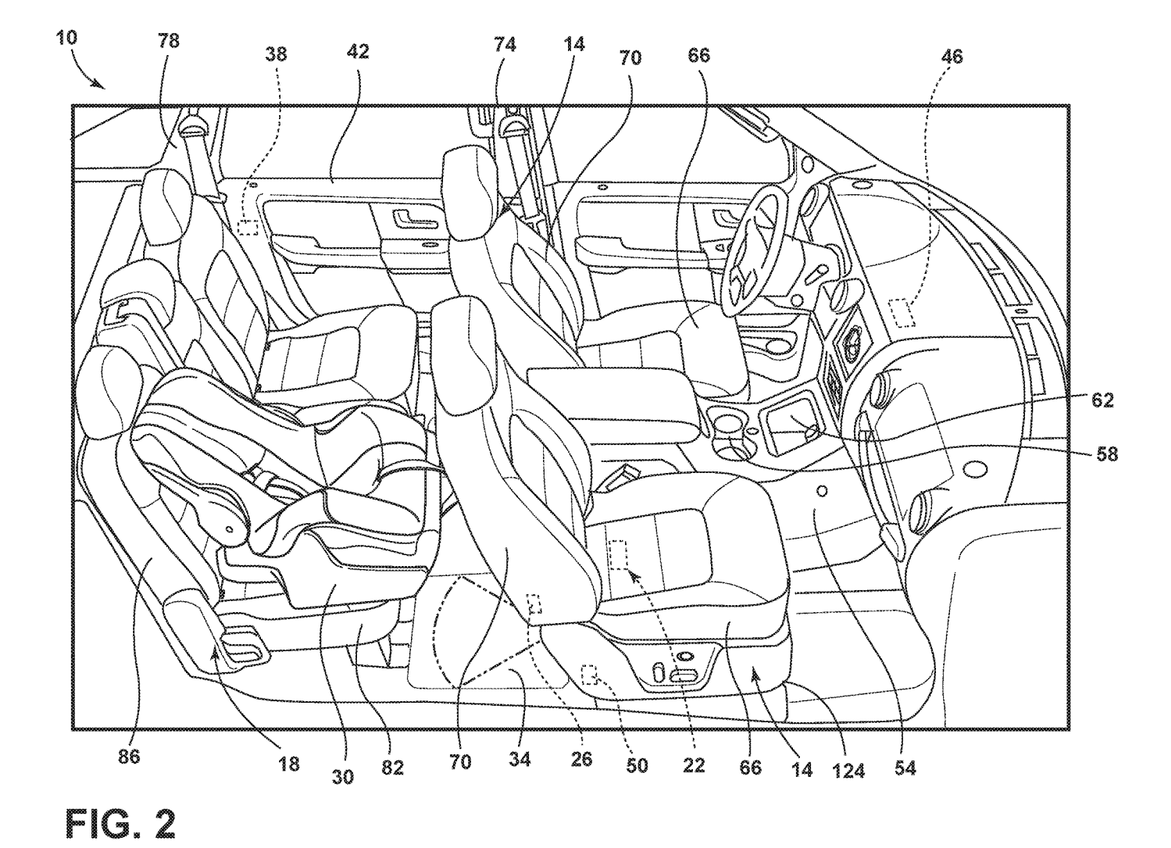
FIG. 2 is a top perspective view of the interior of the vehicle illustrating a child's car seat in a rear seating assembly.
Figure 3:
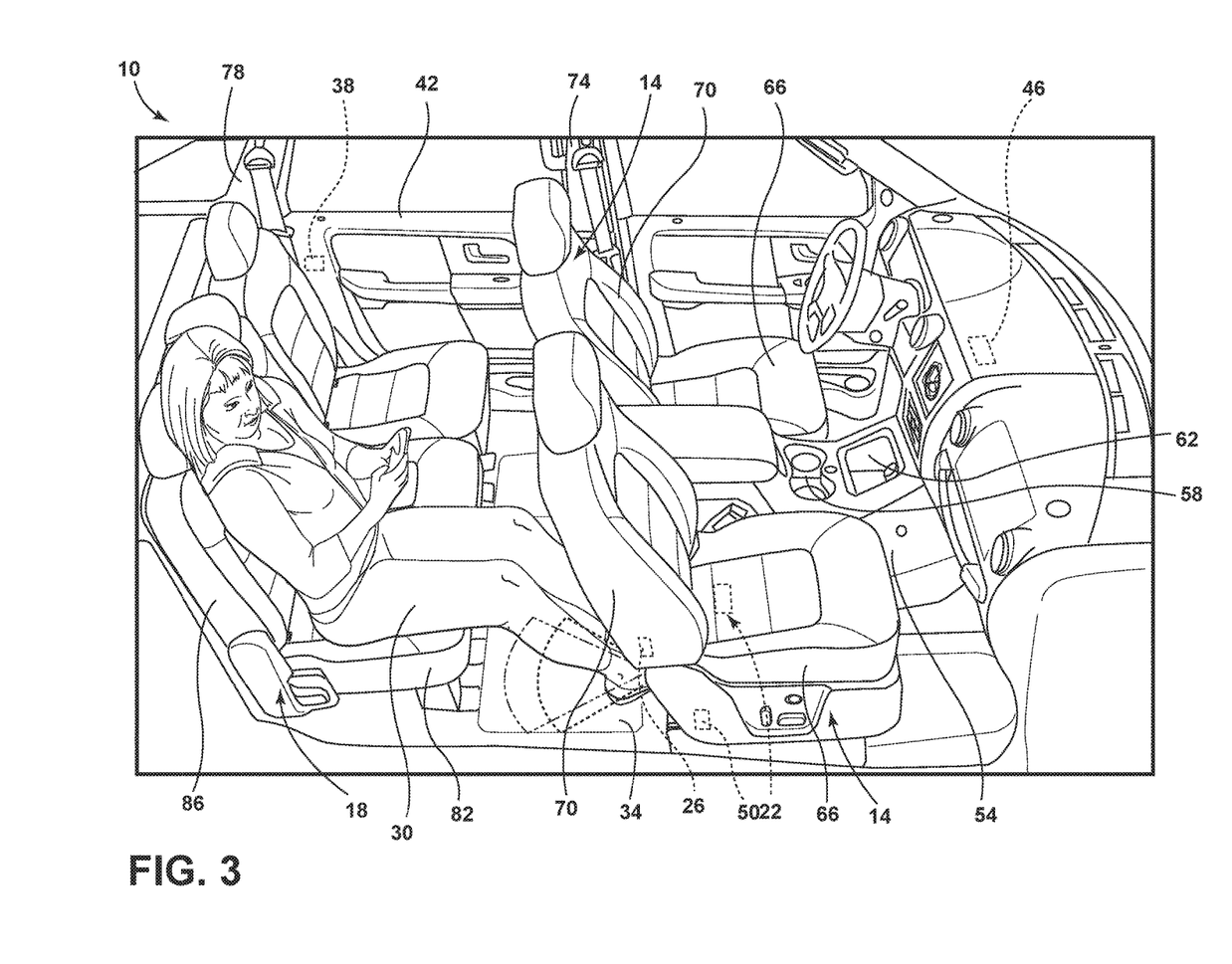
FIG. 3 is a top perspective view of the interior of the vehicle illustrating an occupant in the rear seating assembly and a front seating assembly moved forward of a last-known position.

Referring to FIGS. 1-3, a vehicle 10 includes a front seating assembly 14 and a rear seating assembly 18. The front seating assembly 14 may include an occupant sensor 22 that is configured to sense an occupant status of the front seating assembly 14. A proximity sensor 26 is utilized to sense the presence of an object 30 in an area behind the front seating assembly 14, such as a footwell 34. A rear door sensor 38 is configured to sense an opening of a rear door 42. A controller 46 may be employed to activate an actuator 50 to move the front seating assembly 14 forward based on the sensed occupancy of the front seating assembly 14, the sensed object 30, and a sensed opening of a door.

The vehicle 10 may include one or more of the front seating assemblies 14. In the embodiment shown, there are two front seating assemblies 14, namely, a driver seating assembly and a passenger seating assembly. A center console 54 may separate the two front seating assemblies 14. The center console 54 can include various storage compartments such as, cup holders 58 and a small item storage bin 62. The occupant sensor 22 can be positioned in one or more of the front seating assemblies 14. For example, the occupant sensor 22 may be positioned in a seat 66 of the front seating assembly 14. Alternatively, the occupant sensor 22 may be positioned in a seatback 70 of the front seating assembly 14. The occupant sensor 22 may be, for example, a weight sensor, a capacitive sensor, a radar sensor, a seatbelt-buckle engagement sensor, or the like for sensing whether or not the front seating assembly 14 is occupied.

The rear door sensor 38 can be positioned in the rear door 42 to sense an open position of the door. Alternatively, the rear door sensor 38 may be positioned proximal a B-pillar 74 for example, within or adjacent to a hinge assembly for the rear door 42. In another alternative, the rear door sensor 38 may be positioned in a C-pillar 78 in the vehicle 10 (e.g. within or adjacent to a latch for the rear door 42).

The proximity sensor 26 is positioned in the interior of the vehicle 10 in such a manner as to sense the presence of the object 30 in an area that is rearward of the front seating assembly 14. For example, the proximity sensor 26 may monitor the footwell 34 that is rearward of the front seating assembly 14 and sense the presence of the object 30. It is contemplated that suitable locations for the proximity sensor 26 include, but are not limited to, in the seat 66 of the front seating assembly 14, in a rearward portion of the seat 66, in the seatback 70 of the front seating assembly 14, in a rearward portion of the seatback 70, in the center console 54, in a rearward portion of the center console 54, in a floor board of the vehicle 10, in a seat base 82 of the rear seating assembly 18, in a backrest 86 of the rear seating assembly 18, or any other suitable location within the vehicle 10 that permits monitoring of an area rearward of the front seating assembly 14. The object 30 that is detected by the proximity sensor 26 can be for example, a child's car seat, a rear seat occupant, a cargo item, or the like.

Figure 4:
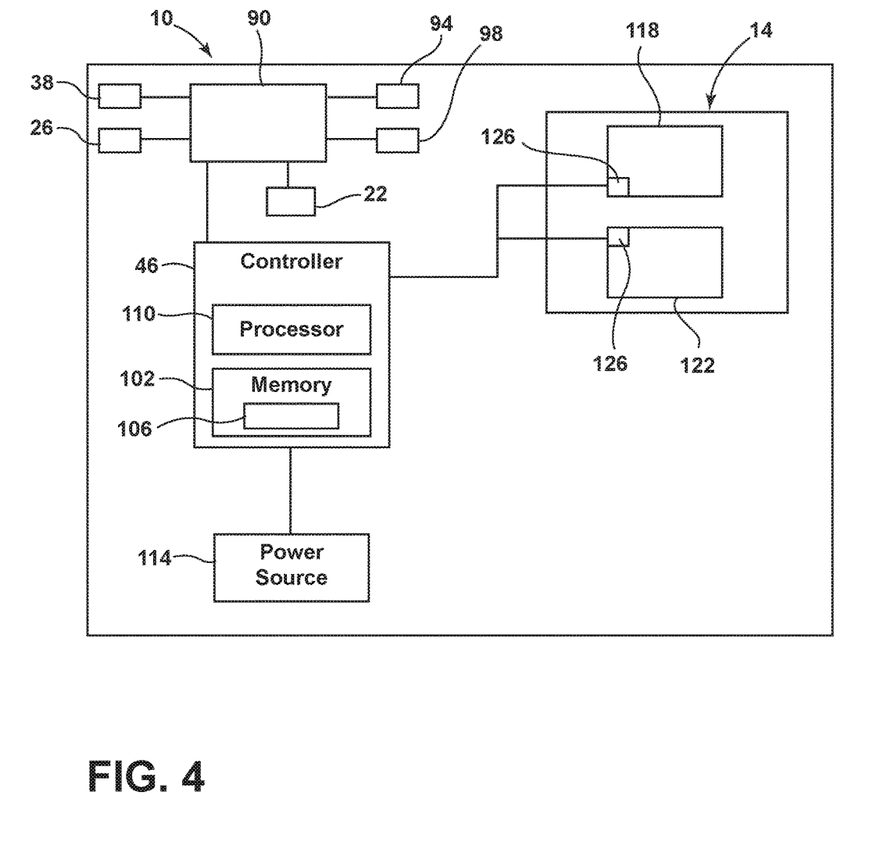
FIG. 4 is a block diagram of the vehicle illustrating controls for controlling the vehicle seating assembly.

Referring now to FIG. 4, depicted is a block diagram of the vehicle 10 in which a method of control ling a vehicle seating assembly, such as the front seating assembly 14, is implemented. The vehicle 10 includes the controller 46 in communication with one or more vehicle control modules 90. The vehicle control module 90 may be configured to relay information to the controller 46 from a variety of sensors. Exemplary sensors include the occupant sensor 22, the proximity sensor 26, the rear door sensor 38, a seatback pitch angle sensor 94, a fore-aft position sensor 98, and the like. The controller 46 may include a memory 102 having a seat position routine 106 contained therein that is executed by a processor 110 of the controller 46. The controller 46 may provide electrical power to the front seating assembly 14 via a power source 114 located on board the vehicle 10. More specifically, the controller 46 may be configured to control a fore-aft actuator 118 and/or a seatback pitch angle actuator 122 based on feedback received from the vehicle control modules 90. The fore-aft actuator 118 and/or the seatback pitch angle actuator 122 may serve as the actuator 50 shown in FIG. 1 that moves the front seating assembly 14 forward. The seat position routine 106 may include a variety of routines configured to cause the controller 46 to adjust the positioning of the front seating assembly 14. For example, the controller 46 may control the fore-aft position on a rail system 124 (FIG. 1) of the front seating assembly 14 via the fore-aft actuator 118 with feedback from the fore-aft position sensor 98. Additionally, the controller 46 may control the seatback pitch angle via the seatback pitch angle actuator 122 with feedback provided by the seatback pitch angle sensor 94. Communication between the controller 46, the vehicle control modules 90, the front seating assembly 14, the fore-aft actuator 118, and the seatback pitch angle actuator 122 can be facilitated by electrical connections 126. It is contemplated that alternative forms of communication between the controller 46, the vehicle control modules 90, the front seating assembly 14, the fore-aft actuator 118, and the seatback pitch angle actuator 122 may be used such as, wireless forms of communication (e.g. Bluetooth).

Referring again to FIG. 4, the seat position routine 106 of the controller 46 may be configured to pivot the seatback 70 of the front seating assembly 14 in a forward direction when it is determined by the controller 46 that the object 30 is present in the footwell 34 behind the front seating assembly 14. In a first example, the seat position routine 106 of the controller 46 may pivot the seatback 70 of the front seating assembly 14 in a forward direction when feedback from the vehicle control modules 90 indicate that the front seating assembly 14 is unoccupied and a cargo item has been placed in the footwell 34 that is rearward of the front seating assembly 14. In another example, the seat position routine 106 may pivot the seatback 70 of the front seating assembly 14 in a forward direction when feedback from the vehicle control modules 90 indicates that the front seating assembly 14 is unoccupied and a child's car seat has been placed in an area rearward of the front seating assembly 14, such as the rear seating assembly 18, as illustrated in FIG. 2. In yet another example, the seat position routine 106 may pivot the seatback 70 of the front seating assembly 14 in a forward direction when feedback from the vehicle control modules 90 indicates that the front seating assembly 14 is unoccupied and a rear seat occupant has entered the rear seating assembly 18 (e.g. feet and/or legs sensed in the footwell 34, occupant sensor in the rear seating assembly 18 indicates an occupied status, etc.) as illustrated in FIG. 3.

Referring further to FIG. 4, in a second example, the seat position routine 106 of the controller 46 may be configured to slide the front seating assembly 14 in a forward direction when it is determined by the controller 46 that the object 30 is present in the footwell 34 behind the front seating assembly 14. For example, the seat position routine 106 may slide the front seating assembly 14 in a forward direction when feedback from the vehicle control modules 90 indicates that the front seating assembly 14 is unoccupied and a cargo item has been placed in the footwell 34 that is rearward of the front seating assembly 14. The controller 46 may additionally verify that the front seating assembly 14 is in a position rearward of the forward-most position prior to activating the fore-aft actuator 118. In another example, the seat position routine 106 may slide the front seating assembly 14 in a forward direction when feedback from the vehicle control modules 90 indicate that the front seating assembly 14 is unoccupied and a child's car seat has been placed in an area that is rearward of the front seating assembly 14, such as the rear seating assembly 18. The controller 46 may additionally verify that the front seating assembly 14 is in a position rearward of the forward-most position prior to activating the fore-aft actuator 118. In yet another example, the seat position routine 106 may slide the front seating assembly 14 in a forward direction when feedback from the vehicle control modules 90 indicates that the front seating assembly 14 is unoccupied and a rear seat occupant has entered the rear seating assembly 18 (e.g. feet and/or legs sensed in the footwell 34, occupant sensor in the rear seating assembly 18 indicates the occupied status, etc.). The controller 46 may additionally verify that the front seating assembly 14 is in a position rearward of the forward-most position prior to activating the fore-aft actuator 118.

Figure 5:
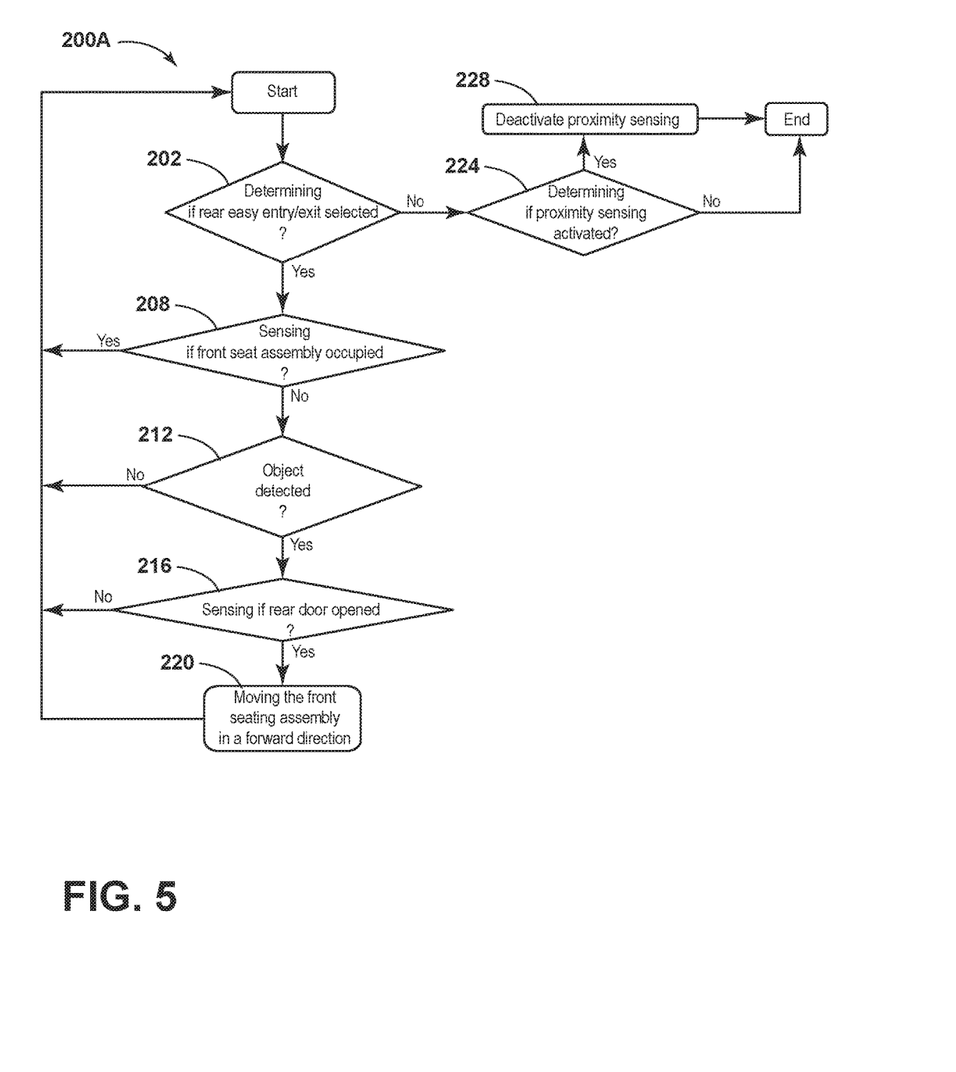
FIG. 5 is a flowchart depicting a logic flow for controlling a vehicle seating assembly, according to one embodiment.
Figure 6:
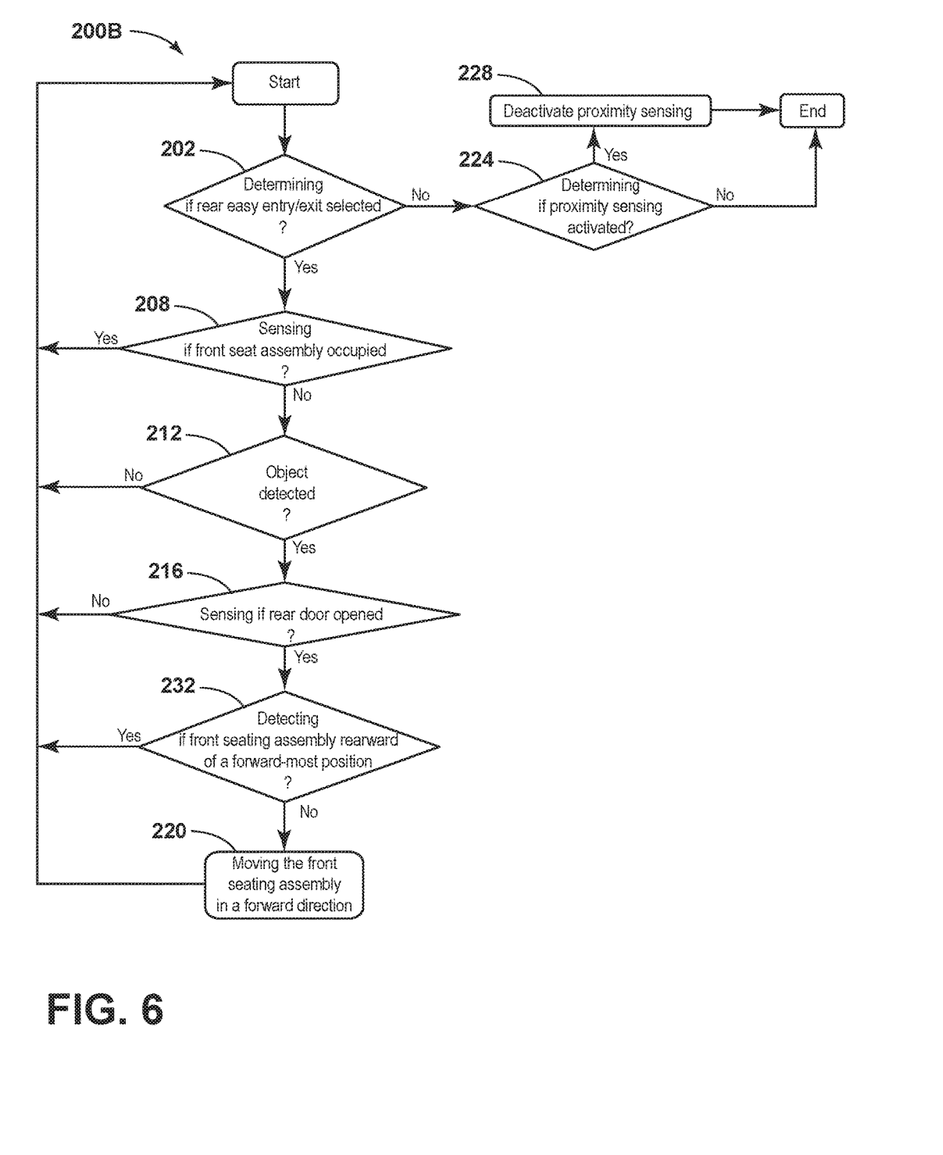
FIG. 6 is a flowchart depicting a logic flow for controlling a vehicle seating assembly, according to another embodiment.
Figure 7:
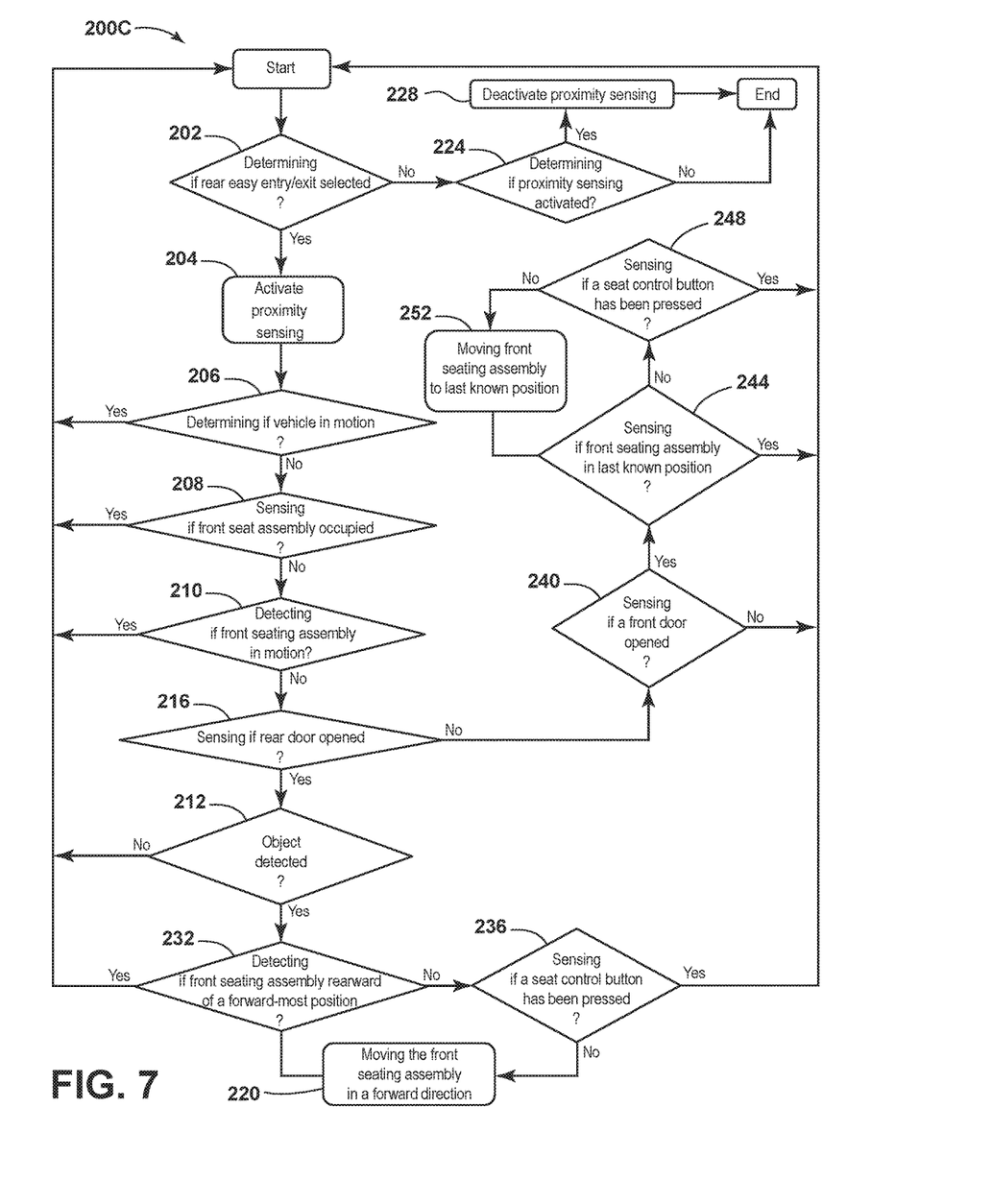
FIG. 7 is a flowchart depicting a logic flow for controlling a vehicle seating assembly, according to a further embodiment.

Referring to FIG. 5-7, methods for controlling a vehicle seating assembly 200A-C, such as the front seating assembly 14, are shown according to various embodiments. In FIG. 5, method 200A includes the step 202 of determining if rear easy entry/exit is selected by referencing the controller 46 to determine if the rear easy entry/exit option has been activated by a user. If step 202 determines that rear easy entry/exit is selected, then method 200A advances to step 208 for sensing an occupied status of the front seating assembly 14 to determine if an occupant is present in the front seating assembly 14, for example via the occupant sensor 22. If step 208 determines that the front seating assembly 14 is unoccupied, then method 200A advances to step 212 for detecting in the footwell 34 behind the front seating assembly 14 to determine if the object 30 is present. The detecting in step 212 may be accomplished, for example, by the proximity sensor 26. The proximity sensor 26 may detect the presence of the object 30 in the footwell 34 by sensing a change in a field emitted and/or sensed by the proximity sensor 26. The field emitted and/or sensed by the proximity sensor 26 may be an infrared field, a capacitive field, sonar, Light Detection and Ranging (LIDAR), or the like. If step 212 determines that the object 30 is present, then method 200A advances to step 216 for sensing a rear door open position, for example, with the rear door sensor 38. If step 216 determines that the rear door 42 has been opened, then method 200A advances to step 220 to actuate the actuator to move the front seating assembly 14 in a forward direction.

If step 202 determines that rear easy entry/exit is not selected, then method 200A advances to step 224 to determine if proximity sensing is activated, for example by the proximity sensor 26. If step 224 determines that proximity sensing is activated, then step 228 initiates deactivating proximity sensing and thereafter method 200A is terminated.

Referring now to FIG. 6, method 200B includes the step 202 of determining if rear easy entry/exit is selected. If step 202 determines that rear easy entry/exit is selected, then method 200B advances to step 208 for sensing an occupied status of the front seating assembly 14 to determine if an occupant is present in the front seating assembly 14, for example by the occupant sensor 22. If step 208 determines that the front seating assembly 14 is unoccupied, then method 200B advances to step 212 for detecting in the footwell 34 behind the front seating assembly 14 to determine if the object 30 is present. The detecting in step 212 may be accomplished, for example, by the proximity sensor 26. If step 212 determines that the object 30 is present, then method 200B advances to step 216 for sensing a rear door position, for example, with the rear door sensor 38. If step 216 determines that the rear door 42 has been opened, then method 200B advances to step 232 for detecting that the front seating assembly 14 is rearward of a forward-most position, for example with the fore-aft position sensor 98. If step 232 determines that the front seating assembly 14 is rearward of the forward-most position, then method 200B advances to step 220 to move the front seating assembly 14 in a forward direction.

If step 202 determines that rear easy entry/exit is not selected, then method 200B advances to step 224 to determine if proximity sensing is activated, for example by the proximity sensor 26. If step 224 determines that proximity sensing is activated, then step 228 initiates deactivating proximity sensing and method 200B is terminated.

Referring to FIG. 7, method 200C includes the step 202 of determining if rear easy entry/exit is selected. If step 202 determines that rear easy entry/exit is selected, then method 200C advances to step 204 to activate proximity sensing, for example with the proximity sensor 26. Once proximity sensing has been activated in step 204, method 200C advances to step 206 where it is determined whether the vehicle 10 is in motion, for example by referencing a speed sensor of the vehicle 10. If step 206 determines that the vehicle 10 is not in motion, then method 200C advances to step 208 for sensing an occupied status of the front seating assembly 14 to determine if an occupant is present in the front seating assembly 14, for example by the occupant sensor 22. If step 208 determines that the front seating assembly 14 is unoccupied, then method. 200C advances to step 210 where detecting movement of the front seating assembly 14 occurs. If step 210 determines that the front seating assembly 14 is not in motion, then method 200C advances to step 216 for sensing a rear door position, for example, with the rear door sensor 38. If step 216 determines that the rear door 42 has been opened, then method 200C advances to step 212 for detecting in the footwell 34 behind the front seating assembly 14 to determine if the object 30 is present. The detecting in step 212 may be accomplished, for example, by the proximity sensor 26. If step 212 determines that the object 30 is present in the footwell 34, then method 200C advances to step 232 for detecting that the front seating assembly 14 is rearward of a forward-most position, for example with the fore-aft position sensor 98. If step 232 determines that the front seating assembly 14 is rearward of the forward-most position, then method 200C advances to step 236 for sensing if a seat control button has been pressed by an occupant. If step 236 determines that no seat control button has been pressed, then method 200C advances to step 220 to move the front seating assembly 14 in a forward direction.

If step 202 determines that rear easy entry/exit is not selected, then method 200C advances to step 224 to determine if proximity sensing is activated, for example by the proximity sensor 26. If step 224 determines that proximity sensing is activated, then step 228 initiates deactivating proximity sensing and method 200C is terminated. If step 216 determines that the rear door 42 has not been opened, the method 200C advances to step 240 for sensing a front door position. If step 240 determines that the a front door is in an open position, then method 200C advances to step 244 for sensing if the front seating assembly 14 is in a last-known position. If step 244 determines that the front seating assembly 14 is not in the last-known position, then method 200C advances to step 248. Step 248 is for sensing if a seat control button has been pressed, similar to step 236. If step 248 determines that no seat control button has been pressed by an occupant, then method 200C advances to step 252 for moving the front seating assembly 14 to the last-known position.

Many of the vehicles 10 available today offer features that maximize the comfort of the occupants of the front seating assemblies 14. However, by maximizing the comfort of the occupants of the front seating assemblies 14, the comfort of the occupants of the rear seating assemblies 18 are sacrificed. Additionally, the comfort settings of the occupant of the front seating assembly 14, for example the driver, can impede access to items in the areas that are rearward of the front seating assembly 14. For example, a driver that has a child's car seat installed directly behind the front seating assembly 14 that the driver is occupying can impede access to the child's car seat and/or make ingress/egress of the child and/or child's car seat more difficult by moving the front seating assembly 14 rearward. The concepts and features disclosed herein alleviate this problem by providing a method of controlling a vehicle seating assembly to facilitate easier access to the object 30 that is rearward of the front seating assembly 14. Additionally, the comfort of the occupant of the rear seating assembly 18 is maximized in an automated fashion when the front seating assembly 14 is unoccupied. Further, ingress and egress of the occupant of the rear seating assembly 18 is made easier by the concepts and features disclosed herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method of controlling a vehicle seating assembly comprising the steps of:
   sensing a front seating assembly is unoccupied with an occupant sensor;
   detecting in a footwell behind the front seating assembly with a proximity sensor that is located in a rearward portion of a seat of the front seating assembly;
   sensing a rear door position with a door sensor; and
   moving the front seating assembly forward when the front seating assembly is unoccupied, an object is in the footwell, and the rear door is in an open position.

2. The method of controlling a vehicle seating assembly of claim 1, wherein the step of detecting an object in a footwell behind the front seating assembly with a proximity sensor further comprises the step of:
   sensing a change in an infrared field by the proximity sensor.

3. The method of controlling a vehicle seating assembly of claim 1, wherein the step of moving the front seating assembly forward further comprises the step of:
   pivoting a seatback in a forward direction.

4. The method of controlling a vehicle seating assembly of claim 1, wherein the step of moving the front seating assembly forward further comprises the step of:
   sliding the front seating assembly forward.

5. The method of controlling a vehicle seating assembly of claim 1, further comprising the step of:
   sensing if a seat control button has been actuated; and
   exiting the method of controlling a vehicle seating assembly upon determining that the seat control button has been actuated.

6. The method of controlling a vehicle seating assembly of claim 1, wherein the step of sensing a front seating assembly is unoccupied with an occupant sensor is performed with a weight sensor in the front seating assembly.

7. The method of controlling a vehicle seating assembly of claim 1, further comprising the step of:
   measuring that a vehicle equipped with the vehicle seating assembly is stationary with a speed sensor.

8. A method of controlling a vehicle seating assembly comprising the steps of:
   sensing a front seating assembly is unoccupied with an occupant sensor;
   detecting in a footwell behind the front seating assembly with a proximity sensor;
   sensing a rear door position with a door sensor;
   moving the front seating assembly forward when the front seating assembly is unoccupied, an object is in the footwell, and the rear door is in an open position;
   exiting the method of controlling a vehicle seating assembly upon determining that the seat control button has been actuated.

9. The method of controlling a vehicle seating assembly of claim 8, wherein the step of detecting in a footwell behind the front seating assembly with a proximity sensor further comprises the step of:
   sensing a change in a capacitive field by the proximity sensor.

10. The method of controlling a vehicle seating assembly of claim 8, wherein the step of moving the front seating assembly forward further comprises the step of:
    pivoting a seatback in a forward direction.

11. The method of controlling a vehicle seating assembly of claim 8, wherein the step of moving the front seating assembly forward further comprises the step of:
    sliding the front seating assembly forward.

12. The method of controlling a vehicle seating assembly of claim 8, wherein the proximity sensor performs the step of detecting an object in a footwell behind the front seating assembly with a proximity sensor located in a rearward portion of a seat of the front seating assembly.

13. The method of controlling a vehicle seating assembly of claim 8, wherein the proximity sensor performs the step of detecting an object in a footwell behind the front seating assembly with a proximity sensor located in a rearward portion of a seatback of the front seating assembly.

14. A vehicle comprising:
    a front seating assembly having an occupant sensor sensing occupancy and a proximity sensor sensing an object in a rearward footwell, the proximity sensor being positioned in rearward portion of a seatback of the front seating assembly;
    a rear seating assembly;
    a rear door sensor sensing opening of a rear door; and
    a controller activating an actuator to move the front seating assembly forward based on the sensed occupancy, a sensed object, the sensed door opening, and sensing the front seating assembly is rearward of a forward-most position.

15. The vehicle of claim 14, wherein the actuator pivots a seatback of the front seating assembly forward when the front seating assembly is moved forward.

16. The vehicle of claim 14, wherein the actuator slides the front seating assembly forward on a rail system when the front seating assembly is moved forward.

* * * * *

UNITED STATES PATENT AND TRADEMARK OFFICE
CERTIFICATE OF CORRECTION

PATENT NO. : 10,377,269 B2
APPLICATION NO. : 15/486625
DATED : August 13, 2019
INVENTOR(S) : Szawarski et al.

Page 1 of 1

It is certified that error appears in the above-identified patent and that said Letters Patent is hereby corrected as shown below:

In the Claims

Column 10; Claim 8, Line 14:
After "position;" insert --sensing if a seat control button has been actuated; and--.

Signed and Sealed this
Tenth Day of December, 2019

Andrei Iancu
*Director of the United States Patent and Trademark Office*